United States Patent [19]
Kagami

[11] Patent Number: 4,762,378
[45] Date of Patent: Aug. 9, 1988

[54] DISPLAY APPARATUS
[75] Inventor: Haruhiko Kagami, Ooizumi, Japan
[73] Assignee: Sanyo Electric Co., Ltd., Japan
[21] Appl. No.: 25,325
[22] Filed: Mar. 13, 1987
[30] Foreign Application Priority Data Mar. 17, 1986 [JP] Japan ............................. 61-58556
Nov. 20, 1986 [JP] Japan .......................... 61-178534[U]
Nov. 20, 1986 [JP] Japan .......................... 61-178535[U]

[51] Int. Cl.$^4$ ............................................. G09D 2/06
[52] U.S. Cl. ...................................... 312/7.2; 248/1 I; 340/720
[58] Field of Search .................. 248/185, 186, 289.1, 248/291, 349, 1 H, 652; 403/348, 365, 247; 340/720

[56] References Cited

U.S. PATENT DOCUMENTS

| | | | |
|---|---|---|---|
| 567,106 | 9/1896 | Lippold | 248/349 |
| 2,476,928 | 7/1949 | Thomas | 403/365 X |
| 3,384,334 | 5/1968 | Malachowski | 248/289 X |
| 3,564,984 | 2/1971 | Alexander | 403/348 |
| 3,970,274 | 7/1976 | Resk | 248/185 |
| 4,267,555 | 5/1981 | Boyd | 340/720 X |
| 4,320,885 | 3/1982 | Kawazoe | 248/185 X |
| 4,480,809 | 11/1984 | Healey | 285/185 |
| 4,579,473 | 4/1986 | Brugger | 248/349 X |

FOREIGN PATENT DOCUMENTS

| | | |
|---|---|---|
| 47-10420 | 7/1972 | Japan . |
| 48-41118 | 5/1973 | Japan . |
| 50-124223 | 3/1974 | Japan . |
| 59-149190 | 3/1983 | Japan . |
| 4013050 | 9/1983 | Japan . |
| 59-17423 | 4/1984 | Japan . |
| 60-62155 | 5/1985 | Japan . |

Primary Examiner—Joseph Falk
Attorney, Agent, or Firm—Darby & Darby

[57] ABSTRACT

A display apparatus of the present invention is constructed so that a front unit mounted with a display device and a back unit supported on a base are connected by a support shaft having an axis meeting at right angle with a screen of the display device, thereby rotating mechanism for the screen of comparatively small-sized and light-weighted but sufficient in strength is realized, also the display unit, which is composed of the front and back units, is to be tilted to vary the angle of elevation, and the display unit is provided with a lock mechanism which can rotate the display unit only when the display unit is tilted upward to the predetermined extent in order to prevent the front unit from accidental rotation when the display unit is tilted downward.

17 Claims, 10 Drawing Sheets

DISPLAY APPARATUS

BACKGROUND OF THE INVENTION

1. Field of the Invention

The present invention relates to a display apparatus, in particular to a display apparatus adapted to be capable of rotating a screen by 90° so that a picture on the screen may match both a longitudinally long form and a sideways long form made by a word processor and the like and the screen may be tilted in accordance with a direction of operator's eyes.

2. Description of the Prior Art

A CRT display unit, which is side ways long to an extent of an aspect ratio of usually 3:4, has been used as a display apparatus. Accordingly, when a longitudinally long document, which is usually used, is made by a word processor, a problem has occurred in that the wastefulness is very large since a screen of the display unit of a word processor is sideways long.

In addition, when the display apparatus is placed on a desk, the screen has become difficult to be seen according to a physique of an operator, more concretely to a direction of the operator's eyes changed due to a height of the eyes.

In order to solve such problems, U.S. Pat No. 4,267,555, Japanese Utility Model Publication No. 40-13050 (1965), Japanese Utility Model Laid-Open No. 47-10420 (1972), Japanese Utility Model Laid-Open No. 48-41118 (1973), Japanese Utility Model Laid-Open No. 60-62155 (1985), Japanese Utility Model Laid-Open No. 50-124223 (1975), Japanese Utility Model Laid-Open No. 59-149190 (1984) and the like have been proposed.

According to U.S. Pat. No. 4,267,555, a screen of a CRT is adapted to be capable of rotating by 90° relatively to a back unit by combining a front unit provided with a CRT with the back unit provided with a display yoke by means of an annular thrust bearing. However, in this invention since the annular thrust bearing is used, problems occur in that the display unit is increased in weight, the installation of the display unit requiring a comparatively large space, and also the assemblage of the display unit being complicated.

According to Japanese Utility Model Publication No. 40-13050 (1965), a rear end portion of a front unit carrying a CRT is adapted to be engaged with an opening formed on a front face plate of a back unit to be supported by an edge of a front face plate of the back unit cabinet and capable of being rotated. However, a problem occurs in that a cabinet plate must be thick in order to gain a sufficient constructive strength for supporting the front unit carrying the CRT having a considerable weight by the back unit, whereby increasing the weight.

According to Japanese Utility Model Laid-Open No. 47-10420 (1972), a cabinet, which is formed in a cylindrical shape, is adapted to be rotated with being put and supported in an annular supporting frame. However, according to the present device, the cabinet is increased in size exceeding the necessity, whereby increasing a weight coupled with the annular supporting frame. In addition, since an antenna wire, a power source wire and the like drawn out from the cabinet are rotated together with the cabinet, there is also the possibility that they are disconnected due to the twisting.

According to Japanese Utility Model Laid-Open No. 48-41118 (1973), a disk, which is mounted on a front end surface of a CRT, is adapted to be put in a hole formed in a front end of a cabinet to be rotated. However, a construction for bearing a weight of the CRT is not taken into consideration in the same manner as in the above described Japanese Utility Model Publication No. 40-13050 (1965).

According to Japanese Utility Model Laid-Open No. 60-62155 (1985), a middle portion in the longitudinal direction of a cabinet formed in a cylindrical shape is adapted to be supported by a roller mounted on a supporting arm, pivoting a center of a rear end portion of the cabinet thereon. With such a construction, although a weight of a CRT can be sufficiently born, the cylindrical portion of the cabinet is merely laid on the roller. Accordingly, a problem occurs in that the cabinet is not surely held by the supporting arm.

According to Japanese Utility Model Laid-Open No. 50-124223 (1975), a picture of a television receiver is adapted to be rotatable around a horizontal axis of shaft line and a vertical axis of shaft line relatively to a base table. Concrete constructions thereof, in which a spherical cabinet housing a CRT thereinside is placed in a dented portion of the base table of the cabinet, or, in which the spherical cabinet is installed in a ring-like frame by means of arms projecting from both sides of the cabinet, and the like are shown in the drawings. Although such constructions may be possible for a portable type television monitor, it is thought that there is a problem of strength for a display device larger in size than a certain extent.

According to Japanese Utility Model Laid-Open No. 59-149190 (1984), a display unit is supported by a ball and socket type supporting equipment in order to be capable of tilting the whole display unit. But in such a construction, the weight of the display unit placed upside cannot be supported stable unless the ball and socket type supporting equipment is made larger than certain extent.

In view of such a matter, it is desired to provide a comparatively large-sized display device provided with a mechanism capable of rotating and tilting a screen but light, small-sized and sufficiently strong.

In addition, in a display apparatus capable of not only rotating but also tilting a screen, it becomes unstable because the weight thereof inclines toward the front portion of the display unit, and there is the possibility that the corner portions of a front face of a cabinet of the display unit come into collision with the base which supports the display unit, when the screen is intended to be rotated at a tilt angle smaller than a certain angle, that is to say under the condition that the screen is tilted at an angle smaller than a certain angle. There is the possibility that such a situation leads to an accident. In order to prevent the accident from occurring, the main body is placed on higher position, but is to be excessibly unstable due to the weight of the rolling mechanism of the screen, as described above, so a countermeasure for such an accident is required.

SUMMARY OF THE INVENTION

The present invention was achieved in view of the above described matters.

It is a first object of the present invention to provide a display unit provided with a comparatively small-sized, light and sufficiently strong mechanism for rotating a screen.

It is a second object of the present invention to provide a display unit capable of tilting a screen in correspondence to a direction of an operator's eyes.

It is a third object of the present invention to provide a display unit capable of being small-sized, light and sufficient strength and stability when simultaneously achieving the above described first and second objects.

It is a fourth object of the present invention to provide a display unit capable of preventing a rotation of the display unit and securing the safety by constructing so as to inhibit the rotation of a screen under the state that the tilt angle of the screen is smaller than a certain limit.

The display device of the present invention is provided with a front unit for mounting a display device, a back unit for supporting said front and a base and a supporting frame which is fixed on said base and supports said back unit, comprising a first plate chassis which is mounted with a support shaft having an axis crossing to a screen of said display device and a second plate chassis which has a bearing hole for said support shaft, one of said chassis being fixed on a back face of said front unit and the other being fixed on a front face of said back unit, a first annular spacer being engaged to encircle said support shaft at the position between said first and second plate chassis and a second annular spacer being engaged to encircle the same at the position opposite to said first spacer with said second plate chassis being therebetween, under a state that said support shaft is inserted into said bearing hole, a mounting plate which is fixed on said support shaft and interposes said first and second spacers with said first plate chassis therebetween to hold them, and a tilting mechanism for tilting said back unit against said supporting frame to vary an angle of elevation of the screen of said display device.

The above and further objects and features of the invention will more fully be apparent from the following detailed description with accompanying drawings.

DESCRIPTION OF THE PREFERRED EMBODIMENT

A display apparatus according to the present invention is described below in detail with reference to the drawings.

At first, a tilting mechanism of a display apparatus according to the present invention is described chiefly with reference to FIGS. 1 to 5.

Figure 1:
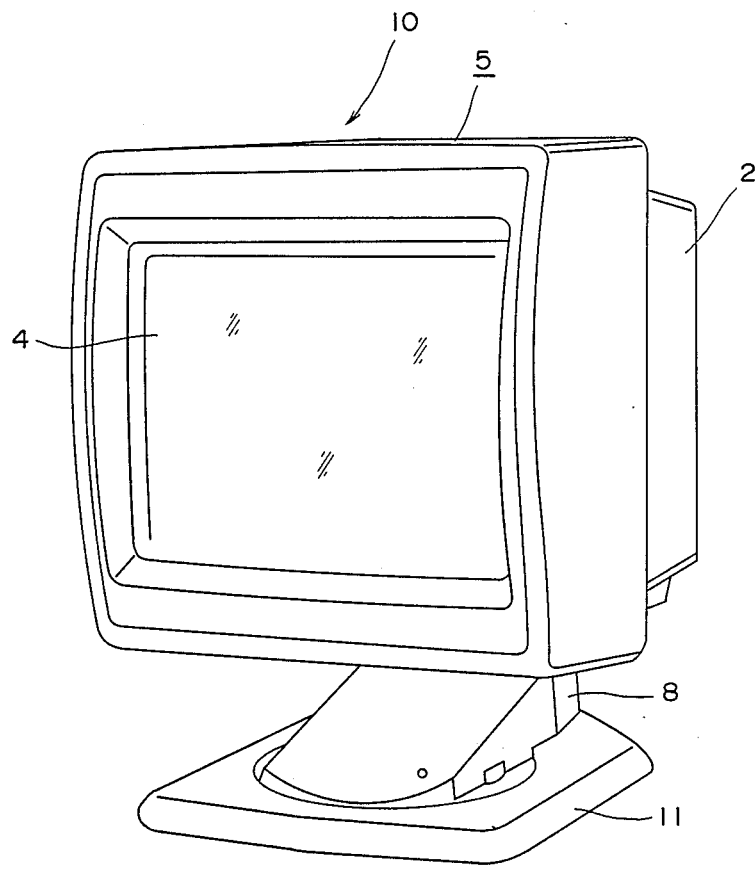
FIG. 1 is a perspective view showing an external appearance of a display unit according to the present invention.

In a general view of FIG. 1, reference numeral 11 designates a base, 8 designating a neck frame fixed on the base 11, 9 designating a back unit supported by the neck frame 8 so as to be tilted, 5 designating a front unit rotatably installed on the back unit 9, 4 designating a screen of a CRT 1 as a display device, and a display unit 10 being composed of the front unit 5 and the back unit 9.

The back unit 9 is composed of back chassis 6 as the structural member thereof and back cabinet 7 as the facing member thereof, also the back chassis 6 has a first back chassis 61 constructing a bottom plate and both side plates thereof, and a second back chassis 62 constructing a back face and a ceiling thereof.

Figure 4:
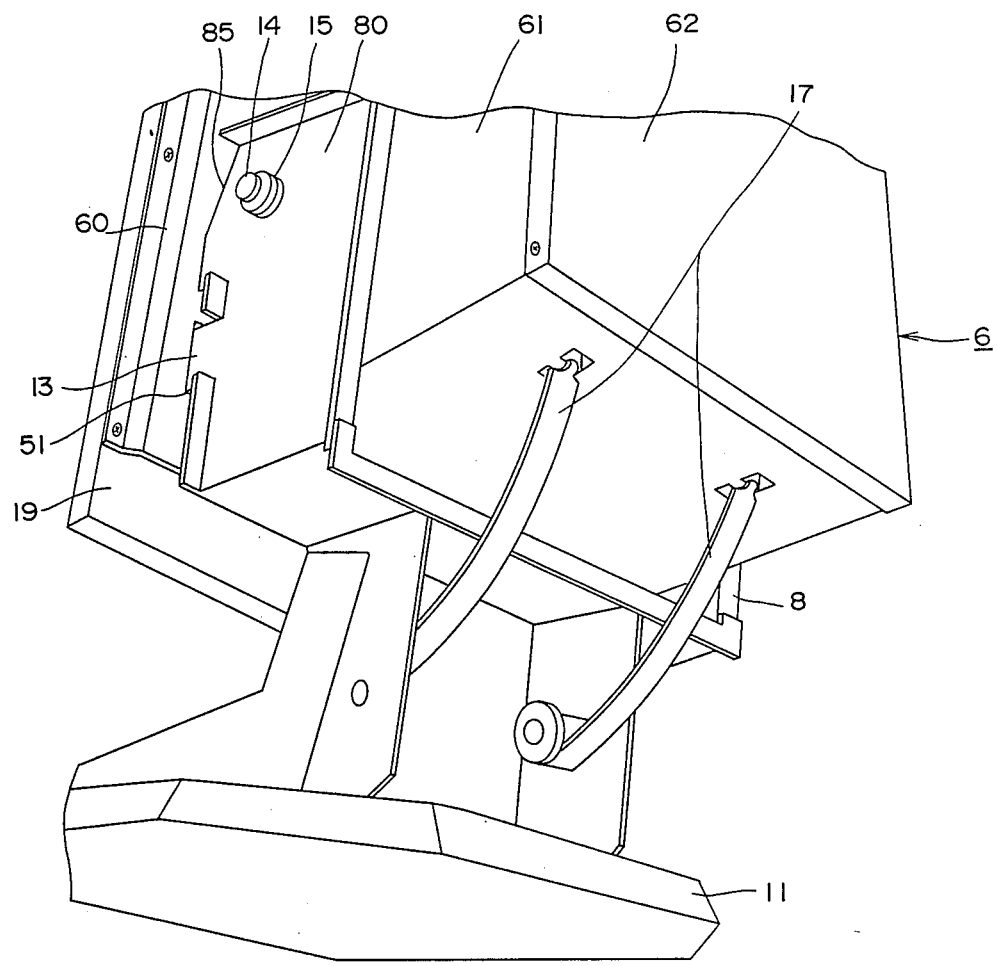
FIG. 4 is a perspective view when seen from a back lower portion after removing a back cabinet in order to show a condition of installing a non-constant spiral spring used as a reverse couple means of a display apparatus according to the present invention.

In drawings, 8 designates a neck frame supported by the base 11 and formed a U-like shape side chassis portion 80 opening upward at the upper part, as shown in FIG. 4. And, the back unit 9 is supported between the turned-up side chassis portion 80, that is to say a right side plate and a left side plate.

Figure 5:
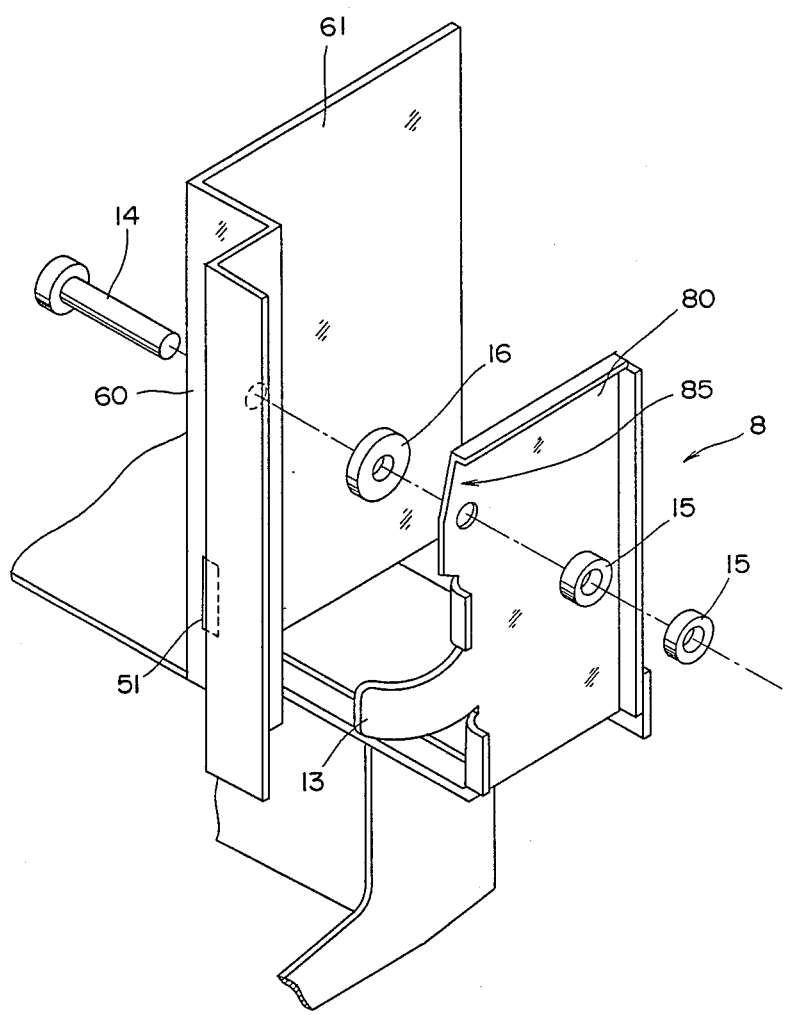
FIG. 5 is a perspective view showing a state of disassembling a lock member for inhibiting the rotation of a supporting portion and a screen of a tilting mechanism of a display apparatus according to the present invention.

And, as shown in FIG. 5, both side plates of the first back chassis 61 of the back chassis 6 are supported between side chassis portion 80 that is to say the right side plate and the left side plate, from both insides by means of a bolt 14 and a nut 15, respectively, whereby back chassis 6, that is to say the back unit 9, is tiltably pivoted on the neck frame 8.

When the back chassis 6 is supported on the side chassis portion 80 by means of the bolt 14 and the nut 15, a friction plate 16 as a friction member between the back chassis 6 and the side chassis portion 80 is put on the bolt 14 so that the bolt 14 may be passed through the friction plate 16.

19 designates a plate-like back plate chassis fixed on a front face of the back chassis 6. This back plate chassis 19 is screwed on an outside bending portion 60 which has been made by bending outwardly the each front end portion of both side plates of the first back chassis 61 of the back chassis 6, then projecting the tip end thereof a little forward (see FIG. 4).

The front unit 5 is composed of the front cabinet 3 as the facing member and the front chassis 2 as the structural member, the CRT 1 being installed on the front chassis 2.

In addition, 18 designates a front plate chassis 18 set up on a back face of the front chassis 2, locating on the back face of the front unit 5 in parallel with the screen 4.

Both plate chassis 18 and 19 are connectedly supported by means of a support shaft 21 in parallel to each other in opposite relation as mentioned later. By dint of this, the back unit 9 and the front unit 5 are incorporatedly united, whereby composing the display unit 10.

A non-constant spiral spring 17 is spanned between the bottom plate of the first back chassis 61 of the back chassis 6 and the neck frame 8. The non-constant spiral spring 17 is one of the members of the tilting mechanism for varying the angle of elevation of the screen 4 and gives the display unit 10 the couple which pulls the back chassis 6 downwardly (counterclockwise on every drawing) around the bolt 14 as the tilting axis.

On the neck frame 8, lock members 13 are projected forward the front plate chassis 18 of a back face of the front unit 5 so that holes 51 and 50 through which the lock members 13 are inserted are formed on the first back chassis 61 and back plate chassis 6. Lock holes 12 in the square shape for engaging the lock members 13 are formed at the front chassis 18 respectively.

Besides, the projecting length of the lock members 13 is decided so that the lock members 13 may be inserted into the lock holes 12 when the tilt angle of the display unit 10 is less than the certain angle.

An action of the tilting mechanism of a display apparatus having the above described construction according to the present invention is described below.

In addition, the tilting mechanism of the display apparatus of this invention is composed of the bolt 14 as the tilting axis, the non-constant spiral spring 17 as the reverse couple means and the friction plate 16 as the friction member.

Figure 2:
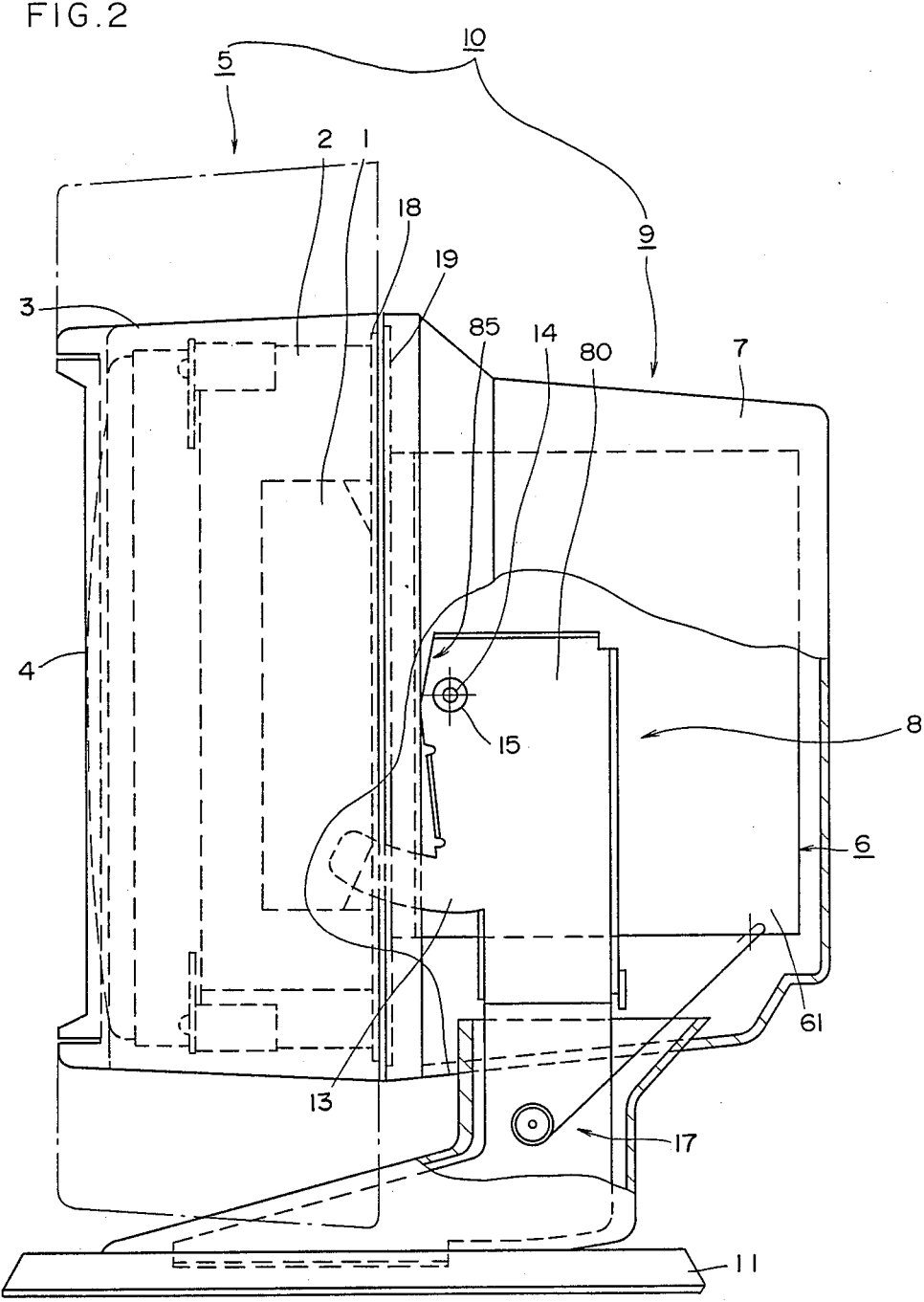
FIG. 2 is a partially broken-out view showing the state of keeping a body of a display unit horizontal by a tilting mechanism for use in a display apparatus according to the present invention.

In the tilting mechanism of the display apparatus according to the present invention, as shown in FIG. 2, in the case where the display unit 10 is under the horizontal state, the couple with the bolt 14 being a rotary supporting shaft as a center acts so as to rotate the front unit 5 downward (counterclockwise on the drawings) since the center of gravity of the whole display unit is positioned in a side of the front unit 5 having the CRT 1. Accordingly, in order to balance this couple, a force having an almost same magnitude as this couple and turning in the direction opposite to this couple, concretely speaking, a certain definite force as such that pulls the back chassis 6 downward by means of the non-constant spiral spring 17, is given, whereby a couple having an almost same magnitude as the couple acting on the front unit 5 downward and turning in the direction opposite to the couple acting on the same is acted on the back unit 9.

In addition, as shown in FIG. 5, since the friction plate 16 is disposed between the first back chassis 61 constructing the side plates of the back chassis 6 and side chassis portion 80 of the neck frame 8 to join the back chassis 6 and the neck frame 8 together by means of the bolt 14 and the nut 15, a friction force acts between the back chassis 6 and the neck frame 8. On the other hand, since a spring constant of the non-constant spiral spring 17 is zero or almost zero for all tilt angles of the display unit 10, a tensile force applied to the back chassis 6 downward is always almost constant. In other words, it is always almost equal to the couple acting on the front unit 5 downward. Accordingly, the couple acting on the side of the front unit 5 with the bolt 14 being the rotary supporting shaft thereof as a center due to the position of the center of gravity of the display unit 10 is nearly balanced with the couple acting on the side of the back unit 9 downward, and the friction force due to the friction plate 16 acts between the back chassis 6 and side chassis portion 80 of the neck frame 8, the display unit 10 comes to a rest at an arbitrary tilt angle.

Figure 3:
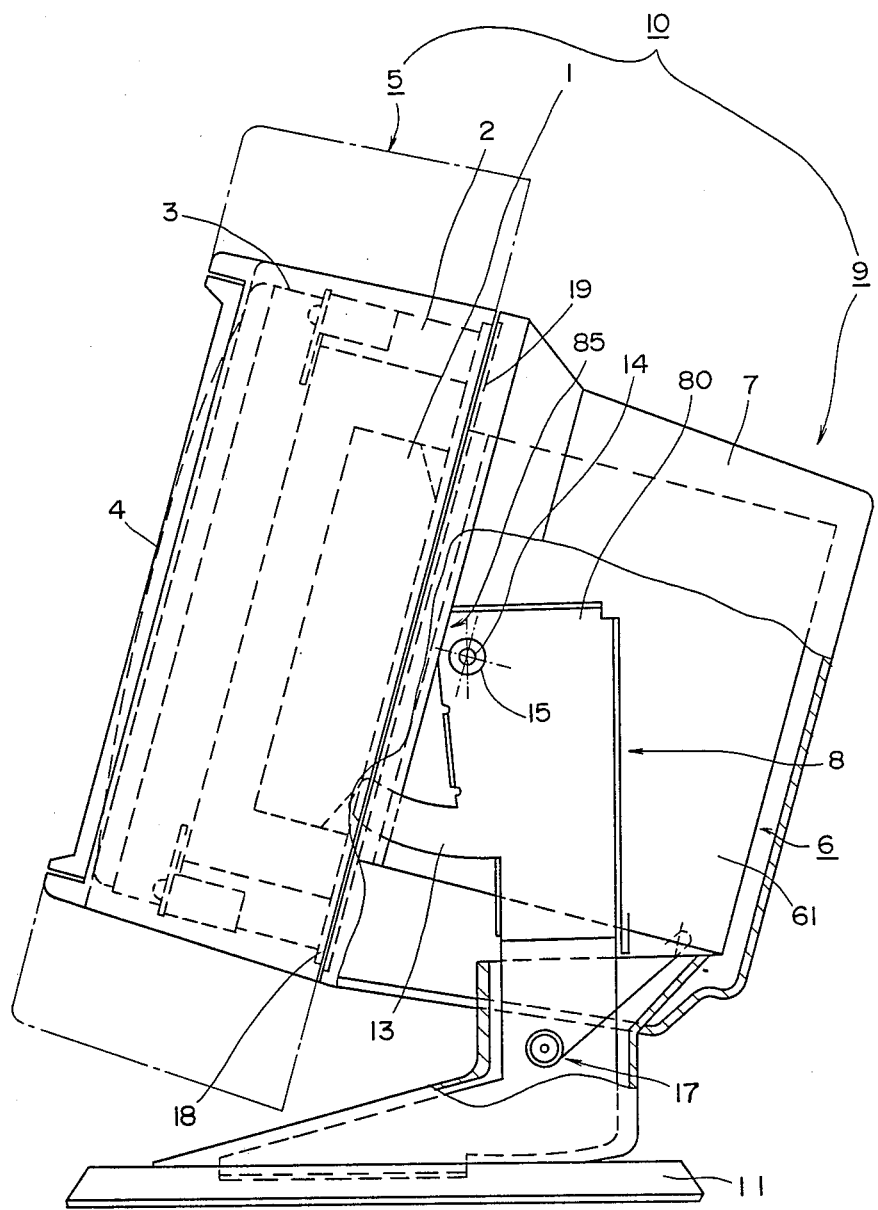
FIG. 3 is a partially broken-out side view showing a state of tilting a body of a display unit upward by a tilting mechanism for use in the display unit according to the present invention.

Incidentally, the upper front parts at the side chassis portions 80 of the neck frame 8 are projected a little forward (the front unit side) relatively to the lower parts thereof, and as shown in FIG. 3, when the front unit 5 is tilted upward by a certain angle, they are brought into contact with the back face of the outside bending portion 60 formed at the front part of the first back chassis 61 of back chassis 6, thereby forming tilt limiting part 85 for prohibiting the display unit 10 from tilting more.

Next, the mechanism for rotating the front unit 5, that is to say the screen 4, of the display apparatus according to the present invention is described chiefly with reference to FIGS. 7 to 10.

21 designates a support shaft for connectedly supporting the front unit 5, that is to say the screen 4, and the back unit 9 so as to be rotatable. In order to insert the neck portion of the CRT 1 into a hollow part therewithin, a cylindrical shaft is used as the support shaft 21. The support shaft 21 is fixedly mounted on the front plate chassis 18 by means of a first annular fixture plate 26, so that its axial direction may be perpendicular to the rear face of the front plate chassis 18 and project to the side of the back unit 9.

22, 23 designate openings formed in the front plate chassis 18 and the back plate chassis 19 respectively, for making the support shaft 21 pass therethrough. These openings 22, 23 have the same diameters but their diameters are slightly larger than an outside diameter of the support shaft 21, concretely speaking, by the sum of a thickness of a ring 28 and a resin sheet 29 which will be described later.

Both 24, 25 designate annular spacers to encircle an outside circumference of the support shaft 21, the first spacer 24 being disposed between the front plate chassis 18 and the back plate chassis 19 while the second spacer 25 is disposed between the back plate chassis 19 and a second annular fixture plate 27 which will be described later.

A first annular fixture plate 26 is used for mounting support shaft 21 on the front plate chassis 18, as described above. Concretely speaking, the first annular fixture plate 26 mounted with the support shaft 21 vertically mounted thereon is mounted on the front plate chassis 18 from the front face of the front plate chassis 18, whereby the support shaft 21 is mounted on the front plate chassis 18.

A second annular fixture plate 27 is fixedly mounted on an end portion of a side of the support shaft 21 opposite to the first annular fixture plate 26. The back plate chassis 19 is put between the spacer 24 and the spacer 25 to support the weight of the front unit 5 by a contact face of both spacers 24, 25 and the back plate chassis 19 by limiting the movement of the above described first spacer 24 and the second spacer 25 in the axial direction between the first annular fixture plate 26 and the second annular fixture plate 27.

By the way, the front plate chassis 18 and the back plate chassis 19 are satisfactorily formed of a galvanized steel plate but the support shaft 21 is preferably formed of aluminium in view of a shape thereof. In the event that such materials are used, if the front plate chassis 18 and the back plate chassis 19 formed of a galvanized steel plate are brought into direct contact with the support shaft 21 formed of aluminium at end portions thereof, the support shaft 21 formed of aluminium is subjected to remarkable wear due to a friction when rotated. Accordingly, in the present preferred embodiment, the ring 28 formed of a galvanized steel plate encircles the support shaft 21 inside the front plate chassis 18 and the back plate chassis 19, and the wear-resistant resin sheet 29 encircles the support shaft 21 inside the ring 28 formed of a galvanized steel plate to prevent the wear and smoothen the action of the support shaft 21.

Next, a mechanism for limiting the rotation of the screen 4 by 90° is explained.

Referring now to FIGS. 7 to 10, reference numeral 20 designates a stopper projected on the back face of the back plate chassis 19, for limiting angle of rotation of the front unit 5 relatively to the back unit 9, as described later.

Figure 9:
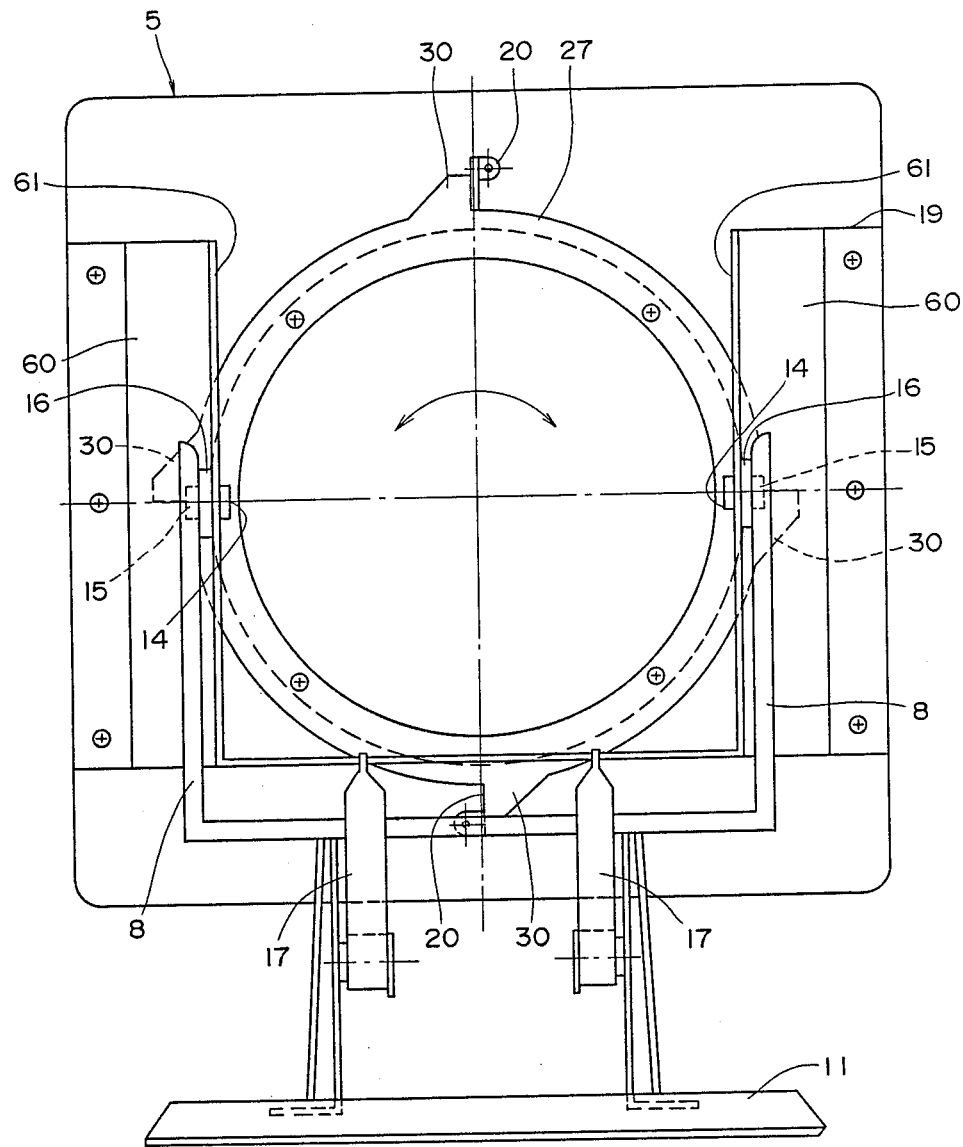
FIG. 9 is a front view showing a mechanism for rotating a screen of a display apparatus according to the present invention in the state of being removed of a back cabinet and a second back chassis when seen from a side of a back thereof.

Concretely speaking, as shown in FIG. 9, the stopper 20 is mounted on the rear face of the back plate chassis 19 at two up and down positions at an interval of 180° so as to be engaged with a stopper-receiver 30 which will be mentioned later.

Figure 10:
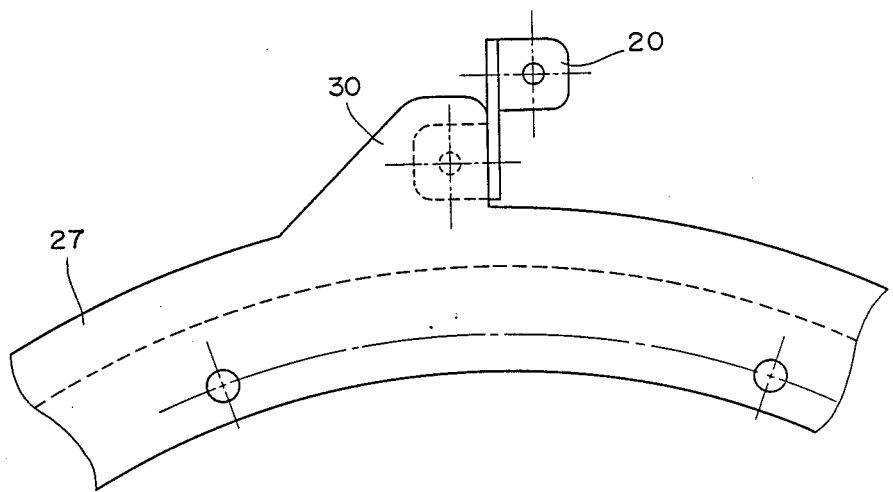
FIG. 10 is a diagram explaining an action of a stopper of a mechanism for rotating a screen of a display apparatus according to the present invention.

30 designates a stopper-receiver projecting in the radial direction from an outside edge portion of the second annular fixture plate 27. The stopper-receiver 30 is formed at four positions with intervals of 90° on the outside edge of the second annular fixture plate 27, as shown in FIG. 9. In addition, each of the stopper-receivers 30 is adapted so that a side thereof parallel to the radial direction of the second annular fixture plate 27 may be engaged with the stopper 20, as shown in FIG. 10. And, a pair of stopper-receivers 30, that is to say, for example in FIG. 9, the stopper-receiver 30 positioned in an upper side and that positioned in a right side as well as the stopper-receiver 30 positioned in a lower side and that positioned in a left side, form opposite sides to be engaged with the stopper 20.

Accordingly, the second annular fixture plate 27, that is to say the front unit 5, can be rotated counterclockwise by 90° from the state shown in FIG. 9.

Figure 8:
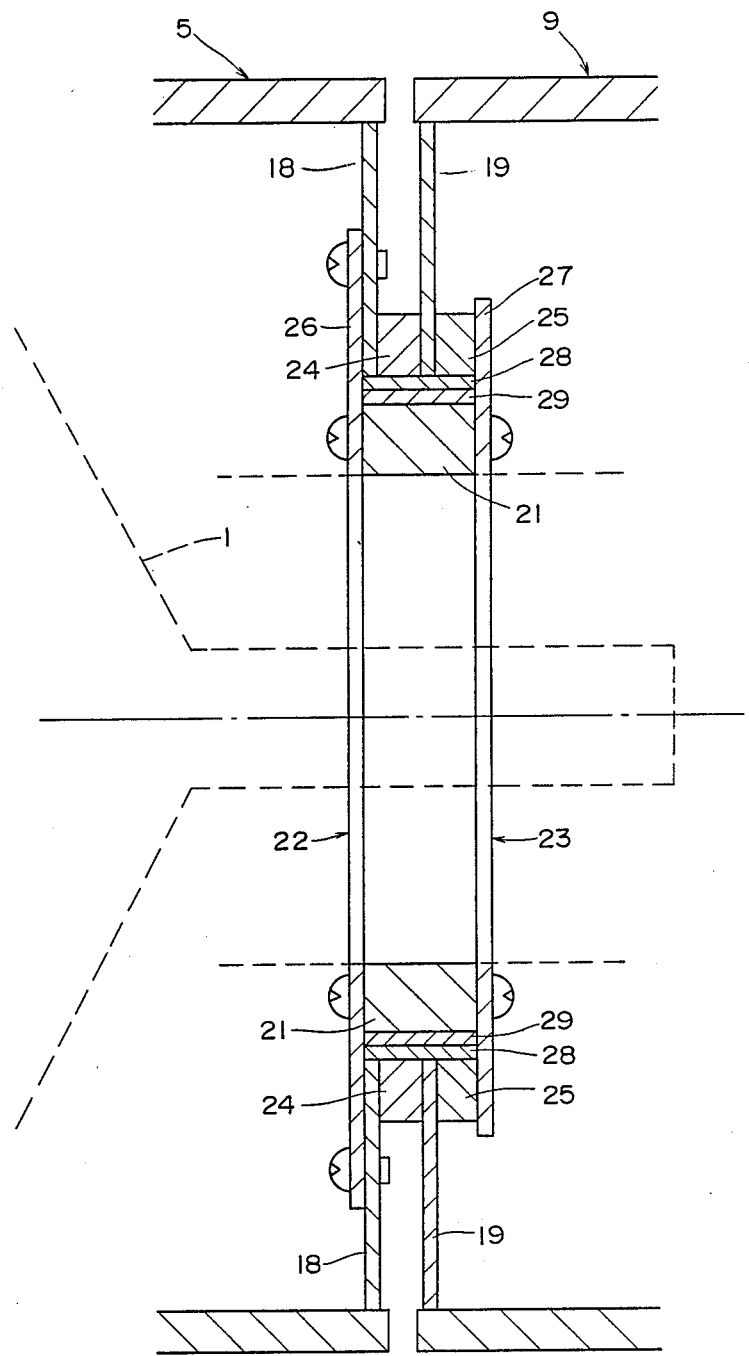
FIG. 8 is a side sectional view showing a mechanism for rotating a screen of a display apparatus according to the present invention.

The mechanism for rotating the screen 4 of the display apparatus according to the present invention is assembled in such a manner as shown in FIG. 8 of the side sectional view thereof. That is to say, the support shaft 21 is mounted on the front plate chassis 18 by means of the first annular fixture plate 26 so as to vertically project toward the rear face of the front plate chassis 18, concretely speaking, the side of the back unit 9. And, the wear-resistant resin sheet 29 is put on the outside circumference of the support shaft 21 and the ring 28 formed of a galvanized steel plate is put on the outside circumference of the wear-resistant resin sheet 29. Subsequently, the first spacer 24 is put on the outside circumference of the support shaft 21 and further the support shaft 21 is inserted into the opening 23 of the back plate chassis 19. Upon putting the second spacer 25 on the support shaft 21 under this state, the second spacer 25 is positioned on the side of the back unit 9 of the back plate chassis 19. Finally, the second annular fixture plate 27 is screwed on the end portion of the side of the back unit 9 of the support shaft 21, whereby the front unit 5 is connected to the back unit 9 through the support shaft 21.

In addition, since the back plate chassis 19 is put between the first spacer 24 and the second spacer 25 so as to be pivoted on the support shaft 21, the back plate chassis 19 and the support shaft 21 are integrally rotatable relatively to the back plate chassis 19.

Besides, since the weight of the front unit 5 is born all over the contact face of both spacers 24, 25 and the front plate chassis 18, a sufficient strength is secured.

In addition, since a pair of adjacent two stopper-receivers 30 of four stopper-receivers 30 projectedly provided on the outside edge of the second annular fixture plate 27 at four positions with intervals of 90° are engaged with the stopper 20 positioned within a moving range thereof, also in the event that the front unit 5, that is to say the front chassis 2 is rotated relatively to the back unit 9, it is not rotated more than 90°.

Next, a machanism for limiting the rotation of the screen 4 by means of the tilt angle of the display unit 10 is described.

As described above, the lock member 13 is projected by each one to right and left toward a rear face of the front unit 5, that is to say toward the front plate chassis 18, from the side chassis portion 80 of the neck frame 8. This lock member 13 further projects forward through the hole 51 bored in the outside bending portion 60 of the first back chassis 61 of the back chassis 6 and the hole 50 of the back plate chassis 19. For example, when the display unit 10 is under a horizontal state, as shown in FIG. 2, the lock member 13 is inserted into each lock hole 12 formed on both right and left sides of the front plate chassis 18 respectively.

Figure 6:
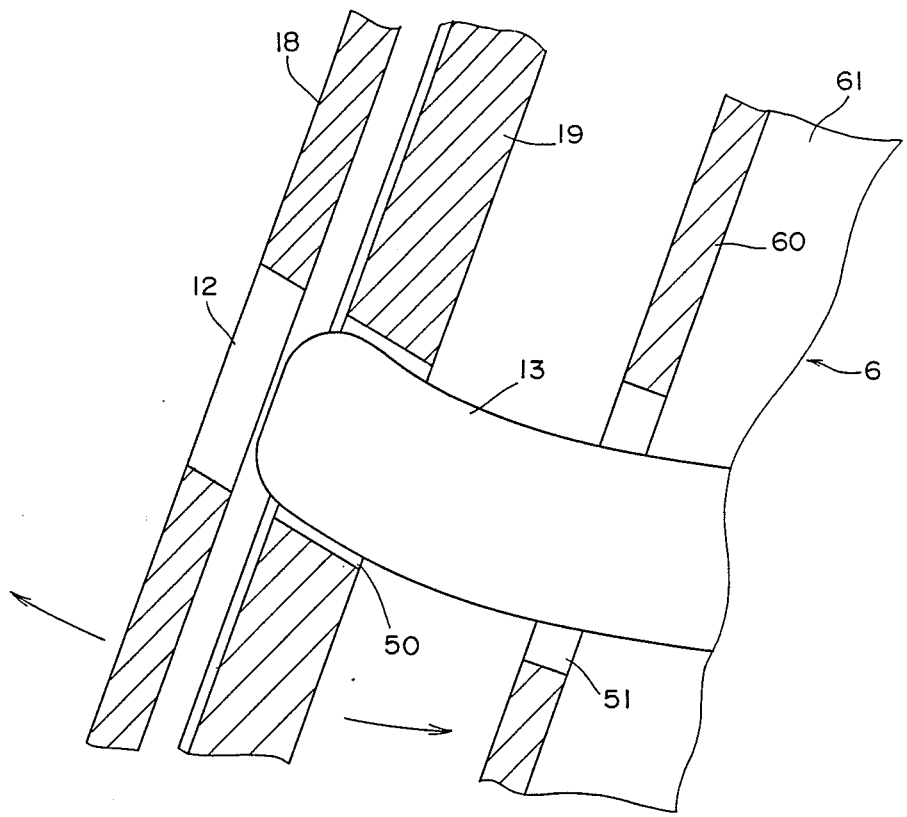
FIG. 6 is a diagram for explaining an action of a lock member inhibiting the rotation of a screen of a display apparatus according to the present invention.
Figure 7:
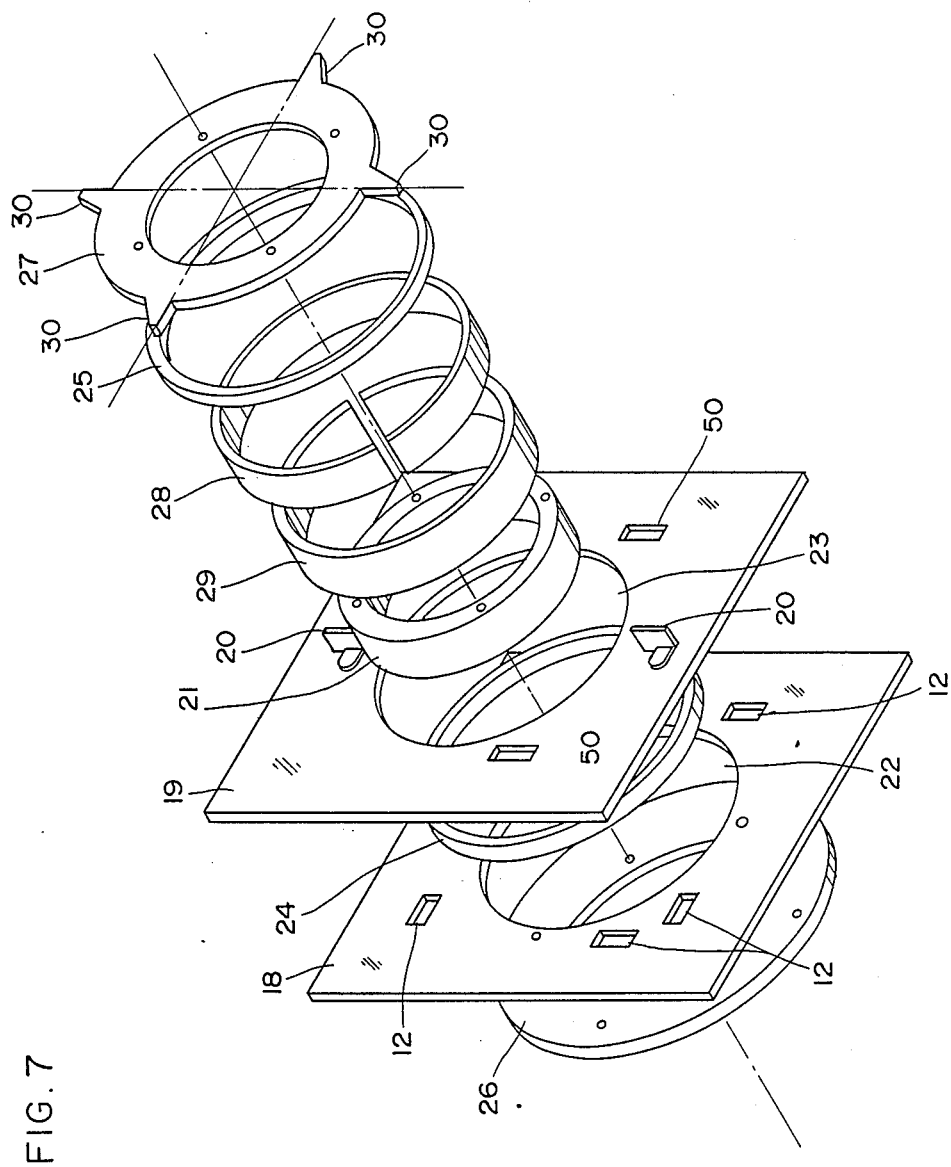
FIG. 7 is a perspective view showing a state of disassembling a mechanism for rotating a screen of a display apparatus according to the present invention.

And, this state, wherein the lock member 13 is inserted into the lock hole 12, is maintained until a time when the display unit 10 is tilted upward to an extent to be engaged with tilt limiting part 85 formed on the upper front part of the side chassis portion 80, as shown in FIG. 3. But, if the display unit 10 is further more tilted upward, the lock member 13 comes out of the lock hole 12, as shown in FIG. 6. In other word, the front unit 5 is locked by means of the lock member 13 to be prevented from rotating by means of the rotating mechanism of the screen 4, which is mentioned above, until the time when it is tilted upward to an extent as shown in FIG. 3.

Furthermore, each lock hole 12 is provided at the end portion on the left side seen from the back face of the front plate chassis 18. Since these lock holes 12 are positioned so that the lock member 13 may be inserted in the state that the front unit 5 is rotated by 90°, whereby enabling the front unit 5 to be locked. In other words, the front unit 5 is to be locked in either normal state or in the state of being rotated by 90°.

As described above, according to the present invention, a display apparatus provided with a relatively light and small-sized but sufficiently strong mechanism for rotating a screen and a tilting mechanism capable of making the display unit rest at an arbitrary tilt angle is provided. In addition, since the screen is adapted to be rotatable only under the state that the display unit is tilted upward at a certain angle or more, an accidental rotation of the screen can be prevented to secure the safety.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A display apparatus, comprising
a front unit for mounting a display device, a back unit for supporting said front unit, a base for supporting of said back unit, a first plate chassis mounted to a support shaft, said support shaft having an axis crossing a screen of the display device, a second plate chassis having a bearing hole for supporting of said support shaft, one said chassis fixed to a back face of said front unit and the other said chassis fixed to a front face of the back unit, a first annular spacer engages and encircles said support shaft and positioned between said first and second plate chassis, a second annular spacer engages and encircles said support shaft and positioned in such a manner that said second plate chassis is interposed between said first and second spacers, said support shaft inserted into said bearing hole, a fixture plate is fixedly attached to said support shaft in such a manner that said first, second annular spaces and said second chassis positioned therebetween are kept together, whereby said display device is rotatable within said support shaft.

2. A display apparatus as set forth in claim 1, wherein said support shaft is a hollow cylinder.

3. A display apparatus as set forth in claim 1, wherein a wear-resistant ring encircles said support shaft and positioned inside said first and second spacers and said second plate chassis.

4. A display apparatus as set forth in claim 1, wherein the axis of said support shaft meets at right angle the screen of said display device.

5. A display apparatus as set forth in claim 1, wherein said fixture plate is provided with radial projections on an outside circumference thereof, said projection disposed from each other at a predetermined angular distance, and said second plate chassis is provided with stoppers on the back face thereof for preventing said mounting plate from rotating more than a predetermined angle by engaging with said projections.

6. A display apparatus as set forth in claim 5, in which said predetermined angle is 90°.

7. A display apparatus, comprising
a front unit for mounting a display device, a back unit for supporting said front unit, a base and a supporting frame fixed to said base, said base supporting said back unit, a first plate chassis mounted to a support shaft, said support shaft having an axis crossing a screen of the display device, a second plate chassis having a bearing hole for supporting of said support shaft, one said chassis fixed to a back face of said front unit and the other said chassis fixed to a front face of the back unit, a first annular spacer engages and encircles said support shaft and positioned between said first and second plate chassis, a second annular spacer engages and encircles said support shaft and positioned in such a manner that said second plate chassis is interposed between said first and second spacers, said support shaft inserted into said bearing hole, a fixture plate is fixedly attached to said support shaft in such a manner that said first, second annular spacers and said second chassis positioned therebetween are kept together, and a tilting mechanism for tilting said back unit against said supporting frame to vary an angle of elevation of the screen of said display device, whereby said display device is rotatable within said support shaft.

8. A display apparatus as set forth in claim 7, wherein said back unit has a back chassis as the structural member;

said tilting mechanism comprising
a stilt shaft supporting said supporting frame, said stilt shaft having an axis crossing said support shaft, a reverse couple means for acting on a couple generated in said front unit, said reverse couple means having a substantially the same magnitude as the couple generated in said front unit, and a friction member for producing a frictional force between said back chassis and said supporting frame for resting of said back unit when a predetermined angle is reached.

9. A display apparatus as set forth in claim 8, wherein said reverse couple means is a spiral spring being spanned between said base, said supporting frame and said back chassis.

10. A display apparatus as set forth in claim 7, wherein said first or second plate chassis are fixed to the back face of said front, said apparatus unit is provided with at least one lock hole, said supporting frame is provided with at least one lock member projected toward the back face of said front unit for inhibiting said front unit from rotating relatively to said back unit by engaging with said lock hole when said back unit is tilted relatively to said supporting frame less than the predetermined angle.

11. A display apparatus as set forth in claim 10, wherein said back unit has a back chassis as the structural member, said supporting frame has a limiting member for inhibiting said back unit from tilting beyond an angle at which said limiting member contacts with said back chassis, and the length of projection of said lock member is determined by said limiting member so that said lock member is unlocked only when the tilting of said back unit is inhibited by said limiting member.

12. A display apparatus as set forth in claim 7, wherein said back unit has a back chassis as the structural member, said supporting frame has a limiting member for inhibiting said back unit from tilting beyond an angle at which said limiting member contacts with said back chassis.

13. A display apparatus as set forth in claim 7, wherein said support shaft is a hollow cylinder.

14. A display apparatus as set forth in claim 7, wherein a wear-resistant ring encircles said support shaft inside said first and second spacer and said second plate chassis.

15. A display apparatus as set forth in claim 7, wherein the axis of said support shaft meets at right angle with the screen of said display device.

16. A display apparatus as set forth in claim 7, wherein said fixture plate is provided with radial projections on an outside circumference thereof, said projections disposed from each other at a predetermined angular distance, and said second plate chassis is provided with stoppers on the back face thereof for preventing said mounting plate from rotating more than predetermined angle by engaging with said projections.

17. A display apparatus as set forth in claim 16, in which said predetermined angle is 90°.

* * * * *